(No Model.)  5 Sheets—Sheet 1.

D. W. PAYNE.
COMBINED CHURN AND BUTTER WORKER.

No. 527,716. Patented Oct. 16, 1894.

Witnesses:
Chas. E. Van Doren.
Henry B. Avery.

Inventor:
Darius W. Payne.
By Paul A. Hawley
his Attorneys

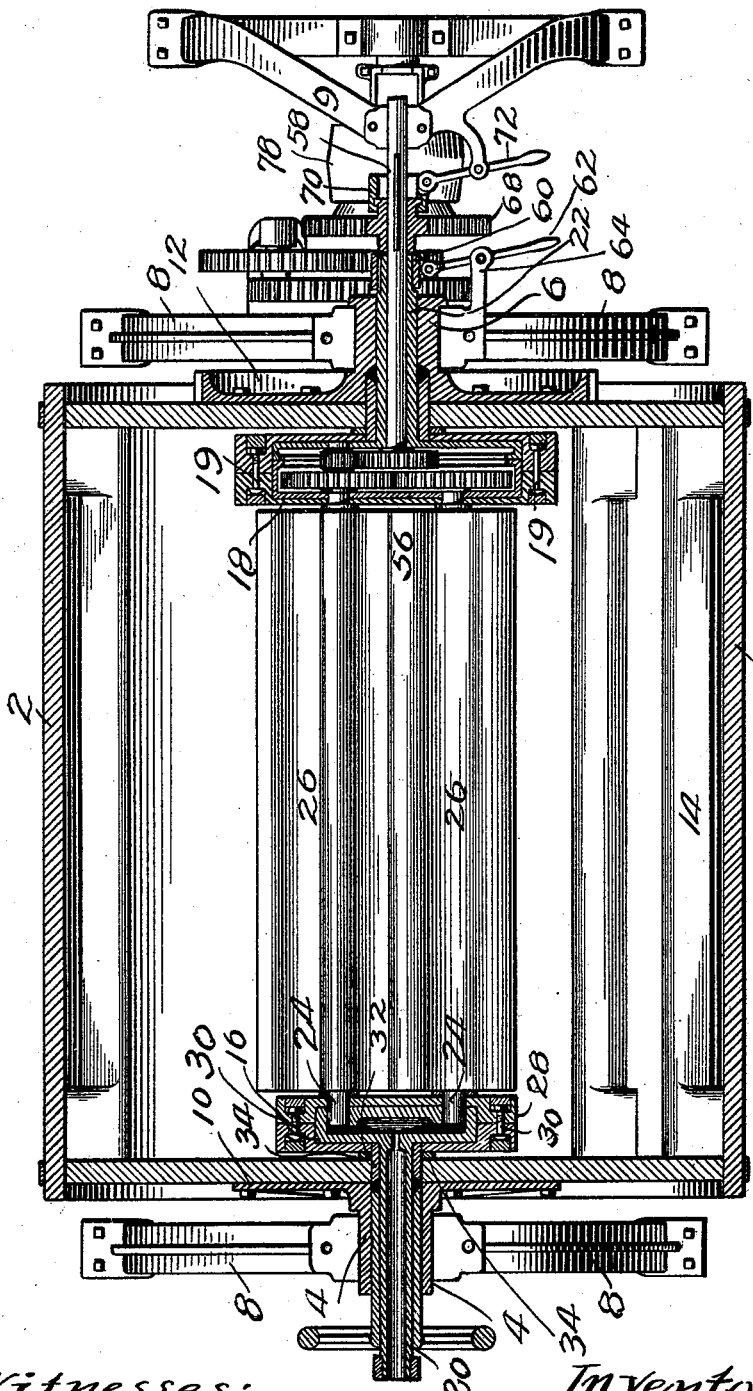

(No Model.) 5 Sheets—Sheet 3.
D. W. PAYNE.
COMBINED CHURN AND BUTTER WORKER.
No. 527,716. Patented Oct. 16, 1894.
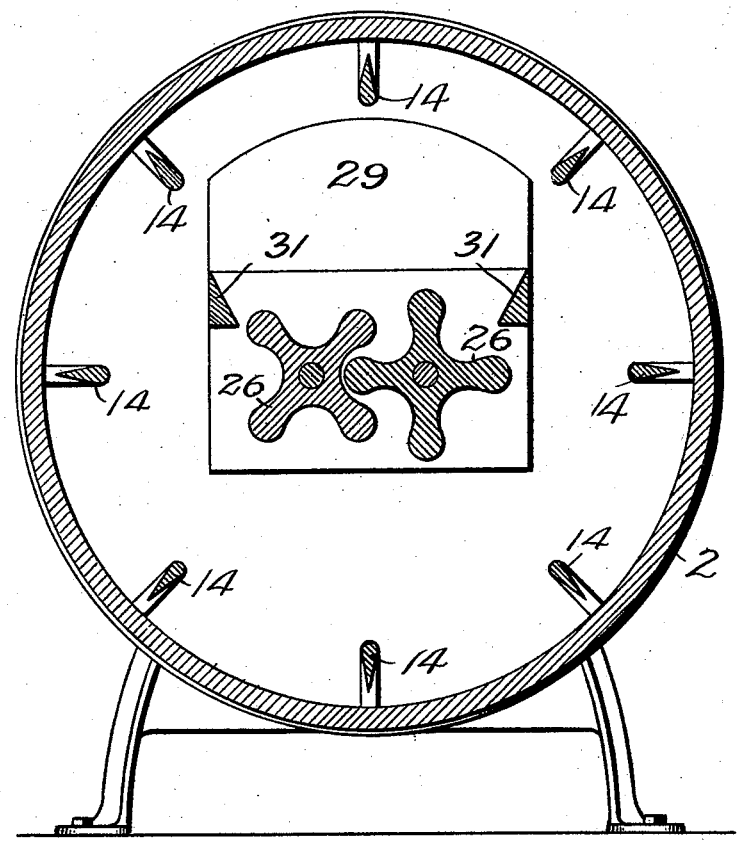
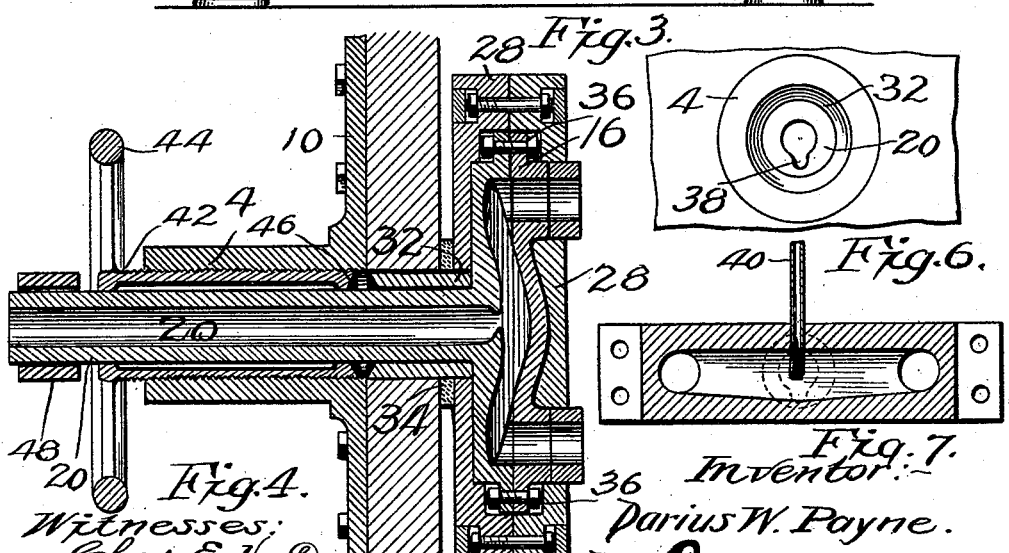
Witnesses:
Chas. E. Van Dow
Henry B. Avery
Inventor:—
Darius W. Payne.
By Paul O. Hawley
his Attorneys.

(No Model.) 5 Sheets—Sheet 4.

D. W. PAYNE.
COMBINED CHURN AND BUTTER WORKER.

No. 527,716. Patented Oct. 16, 1894.

Witnesses:
Chas. E. Van Doren
Henry B. Avery

Inventor:
Darius W. Payne.
By Paul A. Hawley
his Attorneys.

(No Model.) 5 Sheets—Sheet 5.
D. W. PAYNE.
COMBINED CHURN AND BUTTER WORKER.
No. 527,716. Patented Oct. 16, 1894.
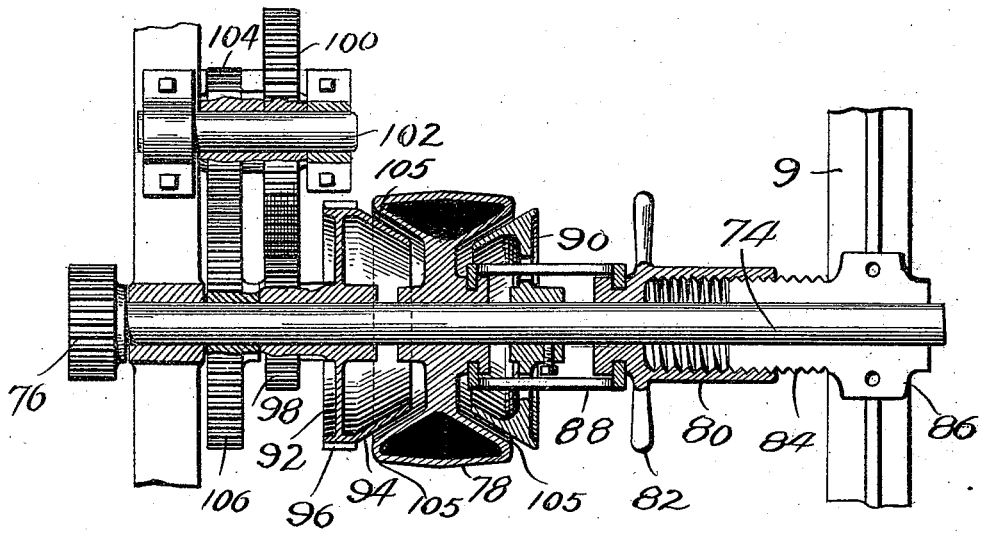
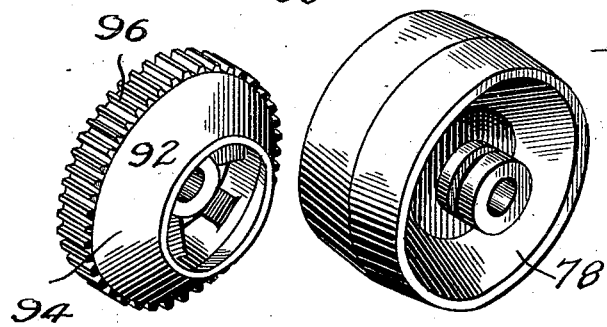
Fig. 9. Fig. 10. Fig. 11.
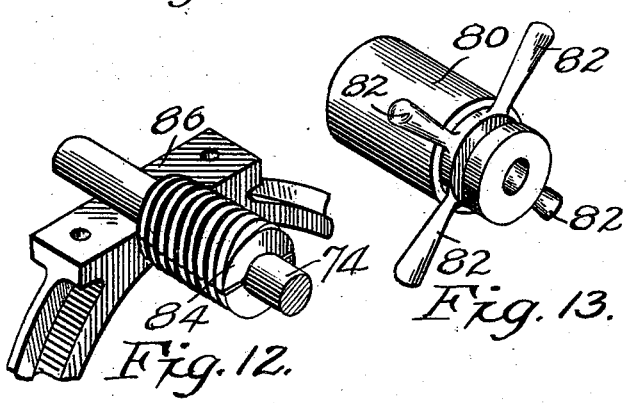
Fig. 12. Fig. 13. Fig. 14.
Witnesses:
Chas. E. Van Doren.
Henry B. Amry.
Inventor:
Darius W. Payne.
By Paul O. Hawley
his Attorneys.

UNITED STATES PATENT OFFICE.

DARIUS W. PAYNE, OF MINNEAPOLIS, MINNESOTA, ASSIGNOR, BY DIRECT AND MESNE ASSIGNMENTS, TO THE F. B. FARGO & COMPANY, OF LAKE MILLS, WISCONSIN.

COMBINED CHURN AND BUTTER-WORKER.

SPECIFICATION forming part of Letters Patent No. 527,716, dated October 16, 1894.

Application filed April 23, 1894. Serial No. 508,566. (No model.)

*To all whom it may concern:*

Be it known that I, DARIUS W. PAYNE, of Minneapolis, Hennepin county, State of Minnesota, have invented a certain new and Improved Combined Churn and Butter-Worker, of which the following is a specification.

My invention relates to a new and improved churn which, after being used for churning, may also be used for working the butter without removing it from the churn.

The objects that I have in view are to provide a simple and inexpensive machine into which the cream may be placed and in which it may be churned; after which the buttermilk may be drawn out and the machine used for working the butter. The machine may be made of a large size and adapted to be driven by power to be used in creameries, or it may be of small size and adapted to be operated by hand and thus be adapted for domestic use.

The invention consists generally in the construction and combination hereinafter described and particularly pointed out in the claims.

Figure 1:
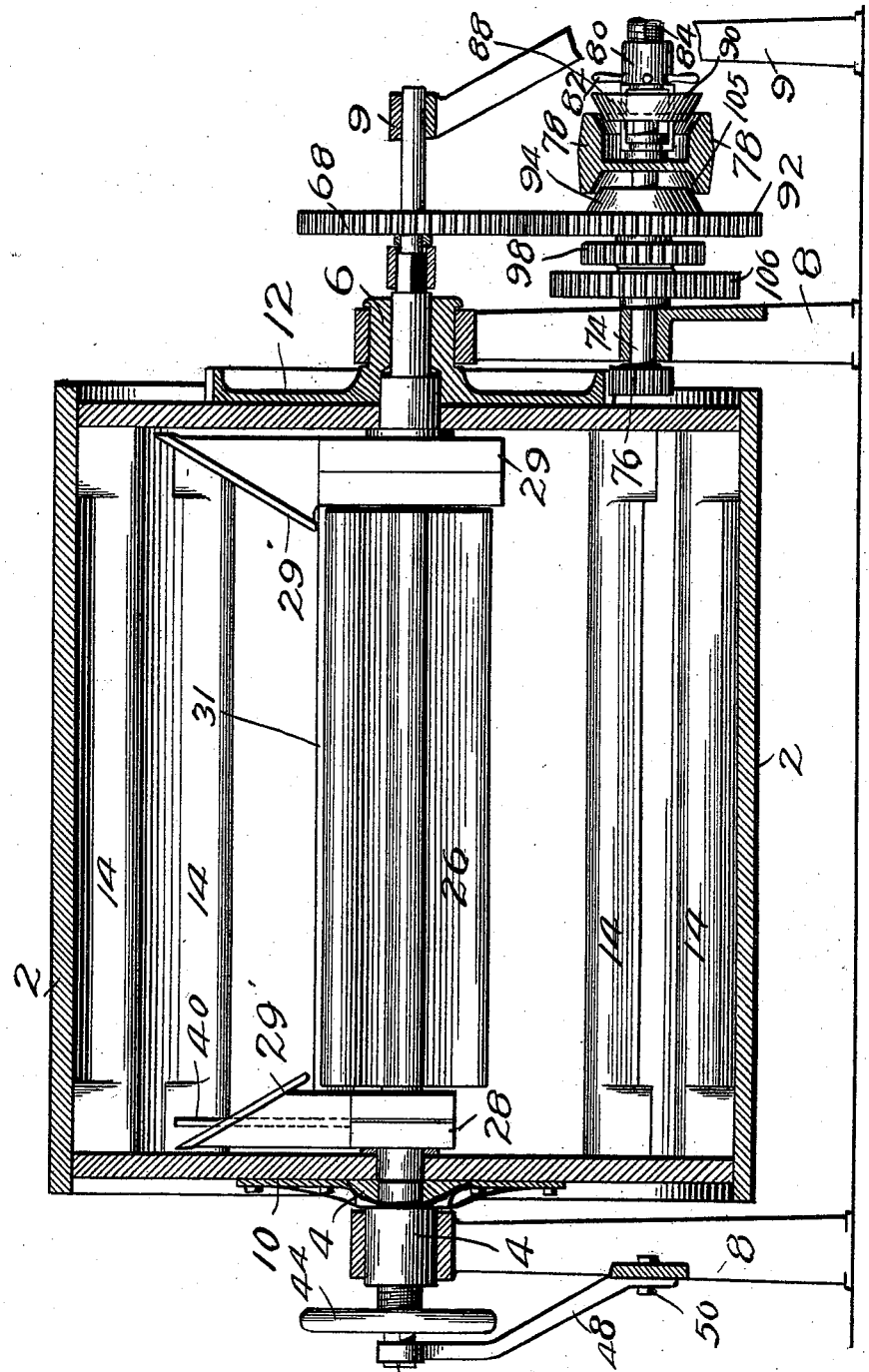
Figure 5:
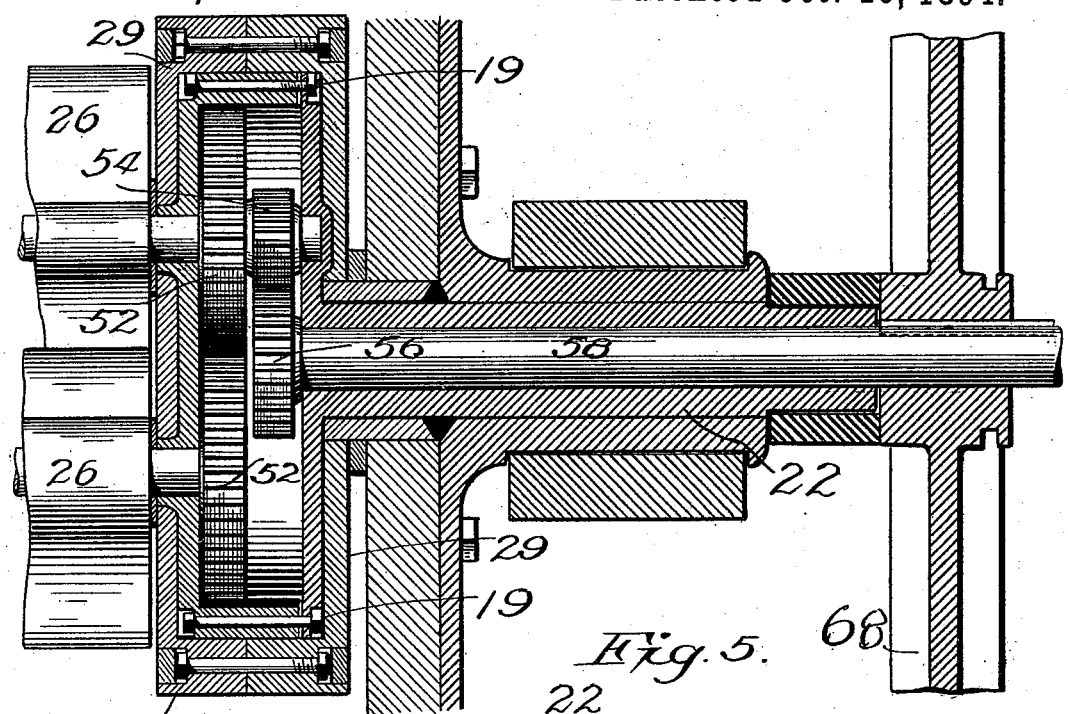

In the drawings forming part of this specification: Figure 1 is a longitudinal vertical section of a machine embodying my invention. Fig. 2 is a horizontal section of the same. Fig. 3 is a transverse vertical section. Fig. 4 is a detail of a portion of one end of the machine. Fig. 5 is a section of the other end of the machine. Figs. 6 and 7 are details showing the supporting boxing for the rolls at one end of the machine. Figs. 8, 9, 10, 11, 12, 13, 14, 15, and 16 are details of the means for supporting and adjusting the parts of the machine.

In the drawings, 2 represents a suitable cylinder preferably formed of wood and provided at its end with the metallic hubs 4 and 6, that are mounted in suitable standards 8, thus supporting said cylinder and permitting the same to turn freely. One end of the cylinder is provided with a suitable metallic flange or spider 10, which is preferably formed integrally with the hub 4 and constitutes the means of securing said hub to the cylinder. At the opposite end of the cylinder is a gear wheel 12 that is formed integrally with the sleeve 6 or is suitably secured thereto, and this gear is secured to the end of the cylinder and constitutes the means through which said cylinder may be rotated.

The interior of the cylinder is provided with a series of flights or carriers 14, that are preferably secured to the inner surface of the cylinder and arranged with their inner edges a short distance from the inner surface of the cylinder. These carriers are preferably formed with the sharp inner edges as shown in Fig. 3, which prevents the butter from accumulating in the space between the inner edges of said carriers and the inner surface of the cylinder. The cylinder is also preferably provided with a suitable door or opening to permit the cream to be placed in the cylinder and the butter to be removed therefrom.

Figure 15:
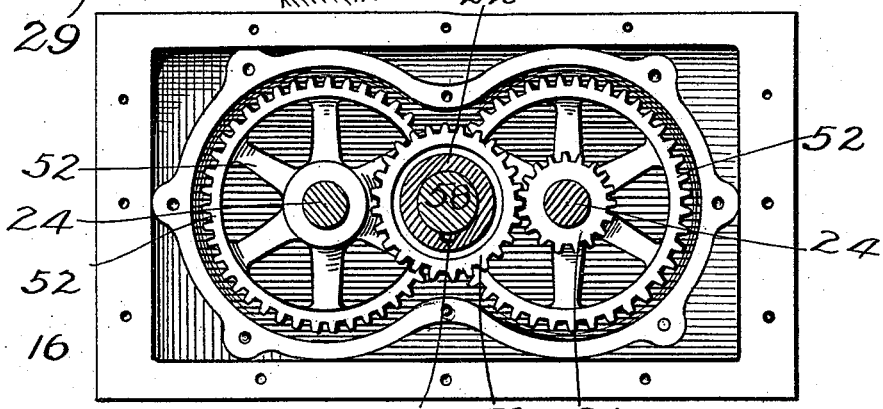
Figure 16:
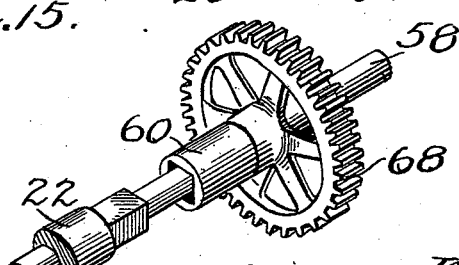

Arranged in the cylinder at each end thereof is a suitable metallic boxing 16—18, each of said boxings being supported upon a hollow shaft 20 and 22 mounted in the hub of the cylinder. The boxing 16 is provided with suitable bearings and receives the journals 24 of the rolls 26. The boxing 16 is preferably hollow and the opening therein communicates with the opening in the shaft 20 so that if any grease or dirt collects in said opening it can escape through the hollow shaft. The boxing 16 is preferably formed of cast iron or other suitable metal and it is covered by a wooden sheathing 28 preferably made in two parts, secured together by suitable bolts 30. The inner end of the hollow shaft 20 is preferably surrounded by a wooden stuffing box 32 and a washer 34 formed of leather or other suitable material, is arranged upon said stuffing box inside of the cylinder, and forms a packing therefor, as shown most clearly by detail in Fig. 4. The boxing 16 is also preferably constructed in two parts, which are connected together by suitable bolts 36, as also shown in the detail drawing, Fig. 4. The shaft 20 may also be provided with a channel 38 for the purpose of facilitating the escape of any material that may collect within the boxing 16. A vent pipe 40 may be connected to the boxing 16 and arranged to open into the space in the interior of said boxing, thereby permitting the gases to escape from the cylinder through this vent pipe and thence through the hollow shaft 20. The hub 4 at this end of the cylinder is preferably interiorly screw threaded and a screw threaded sleeve 42 provided with the hand lever 44 is arranged in said hub so that by turning said sleeve inward the stuffing box 32 may be pushed toward the interior of the cylinder, thereby crowding the boxing at the opposite end of the cylinder toward the wall of the end of the cylinder and making a tight joint at that end, as hereinafter described. Suitable flexible or other packing 46 may, if preferred, be arranged between the end of the sleeve 42 and the end of the stuffing box 32, so as to permit a tight joint being made at this end of the cylinder. The outer end of the shaft 20 is preferably made of rectangular form and an arm 48 provided with a rectangular opening in its upper end, is arranged to engage this end of the shaft, the lower end of said arm being removably connected to the standard 8 by means of a suitable bolt 50. When this arm is in place as shown in Fig. 1, the boxing 16 is held in a horizontal position, thereby holding the rolls in a horizontal position. Shown in Fig. 3. The boxing 18 at the opposite end of the cylinder is similar to the boxing 16, being made in two parts connected together by suitable bolts 19, as shown in Fig. 5, and being covered by a suitable wooden covering 29, also as shown in Fig. 5, and the boxing 18 is provided with bearings for the journals upon the adjacent ends of the rolls 26. This boxing is, however, large enough to receive the gear wheels 52 upon the journals of the rolls and arranged to mesh with each other, as shown in detail in Figs. 5 and 15. The shaft of one of the rolls is also provided with a suitable pinion 54, and this is engaged by a gear wheel 56 on the shaft 58, said shaft 58 being arranged to extend through the hollow sleeve 22 that, as before stated, is formed integrally with one-half of said boxing. It will thus be seen that when the boxing is held so as to maintain the rolls in the horizontal position shown in Fig. 3 and power is applied to the shaft 58 in the manner hereinafter described, said rolls 26 will be rotated toward each other by means of the gearing inclosed within said boxing. The rolls are preferably of the longitudinally grooved form shown in Fig. 3, and they are arranged to mesh with each other, as shown in said figure. The shaft 58 is preferably larger than the journals of the rolls 26, and the sleeve 22 is preferably provided with a channel or recess 23 on its under side, as shown in Fig. 15, so that if any liquid accumulates in the boxing 18, it will run out through the channel 23 instead of escaping around the journals of the rolls 26 into the interior of the cylinder. The sleeve 22 is preferably provided with a square end and for the purpose of holding this sleeve and the boxing 18 in position to maintain the rolls in the horizontal position shown in Fig. 3 a slide 60 is arranged to fit over the squared end of the sleeve and an operating handle 62 pivoted upon a suitable support 64 is connected to this slide so that by this means when preferred the slide can be removed from the end of the sleeve, thus leaving the sleeve and boxing free to rotate with the cylinder. When this slide is removed and the arm 48 is removed from the end of the sleeve 20 that is connected with the other boxing, the boxings 16 and 18 and the rolls carried thereby will rotate with the cylinder. This may be done, if preferred, when the machine is used for churning, and then when it is to be used for working butter the boxings may, by the means described, be again secured in the position shown in Fig. 3, when the cylinder will be rotated on its own axis, and the rolls, while the boxings are maintained in their horizontal position, will each rotate upon its own axis, and the butter carried up by the flights on the inner surface of the cylinder will be dropped upon said rolls and passing between them, the brine or butter-milk will be effectually squeezed out of the butter and this operation will be continued until the butter has been thoroughly worked. A suitable gear wheel 68 is mounted upon the shaft 58 and is splined thereto so as to be capable of sliding upon said shaft while at the same time it rotates therewith. A sleeve 70 is connected to the hub of the wheel 68 and an operating handle 72 is connected to this sleeve and by this means the wheel 68 may be moved along on the shaft 58 as desired. By this means when it is desired to drive the rolls 26 the wheel 68 may be brought into engagement with a gear-wheel on the driving shaft, as hereinafter described, and when it is desired to rotate the cylinder without rotating said rolls, said wheel 68 may be moved so as to disengage it from said gear-wheel on the driving shaft.

The slide 60 hereinbefore referred to is preferably provided with a depending lug which, when said slide is in engagement with the squared end of the sleeve 22, comes in position to engage a lug upon the standard 8. The cylinder is preferably provided above said rolls 26 with a suitable hopper formed by the inclined end-boards 29 and side-boards 31, all of said boards being suitably supported on said boxings 16 and 18.

The outer end of the shaft 74 is preferably supported in a suitable standard 9, and in one of the standards 8, and is provided with a suitable pinion 76 that engages the gear-wheel or pinion on the end of the cylinder. A driving pulley 78 is mounted loosely upon said shaft 74 (see Fig. 8) and is arranged to be driven by a suitable belt applied thereto. The wheel turns freely upon said shaft 74 and slides longitudinally thereon. A sleeve 80, provided with suitable operating handles 82 and having a screw-threaded interior, is arranged upon a screw-threaded projection 84 from the bearing box 86, so that by turning said sleeve 80 it is moved back and forth along said shaft. A coupling 88 (see Fig. 14) is arranged to connect the sleeve 80 with the said driving pulley 78 so as to cause said sleeve and pulley to move together longitudinally of said shaft, but permitting either one to rotate independently of the other. Said coupling is preferably made in two parts as shown in Fig. 14 and said parts are secured together by means of suitable bolts 87. The bars of said coupling pass through the cone pulley 90 that is fast upon said shaft 74. Upon the opposite side of said driving pulley 78 is a wheel 92 having a cone surface 94 and a geared tooth surface 96. This wheel is free to turn upon the shaft 74 and it is with this wheel that the wheel 68 engages. Formed integrally with the wheel 92 or secured thereto is a pinion 98 also free to rotate upon said shaft 74, and this pinion engages with a gear wheel 100 mounted upon a counter-shaft 102 and having connected to it a pinion 104. The pinion 104 engages in turn a gear-wheel 106 that is fast upon the shaft 74. The driving wheel 78 is provided upon its opposite side with the conical friction driving surfaces 105.

The operation of the machine is as follows: The cream being placed in the cylinder, power is applied to the driving wheel or pulley 78, and the sleeve 80 is moved so as to bring said driving wheel into contact with the conical pulley 90 that is secured upon the shaft 74. By this means the shaft 74 is driven, and through the pinion 76 and the gear-wheel 12 power is applied to drive the cylinder for the purpose of churning. If preferred, the rolls 26 may be held stationary by the means heretofore described or the boxings and rolls may be allowed to rotate with said cylinder during the process of churning. If desired to drive the cylinder at a greater speed, the driving pulley may be moved into contact with the conical surface 94 on the wheel 92, in which case during the process of churning, the wheel 68 on the shaft above will be moved out of engagement with the said wheel 92. After the churning process is over and the butter-milk is removed, the wheel 68 may be moved into engagement with the wheel 92, and thereafter the cylinder will be rotated and the rolls, each held in the correct horizontal position, will be rotated on their own axes and this process continued as before stated until the butter is entirely worked.

It will be seen that with this machine the driving wheels for the rolls are thoroughly boxed and protected and the boxings are provided with a suitable wooden covering which prevents the cream or butter from coming in contact either with the gear-wheels, the boxings, or the journals of the rolls. It will also be seen that the machine is simple and inexpensive in construction, that it is thoroughly practical and durable, and that the machine is adapted to be constructed of any suitable size so as to be capable of use either as a domestic machine or as a machine for creameries where large amounts of butter are necessarily handled.

The details of the mechanism and especially of the driving mechanism, may obously be modified without departing from my invention.

Having thus described my invention, I claim as new and desire to secure by Letters Patent—

1. In a combined churn and butter worker, the combination of a suitable cylinder, provided with flights or carriers upon its inner surface, with means for rotating said cylinder, suitable boxings arranged within said cylinder sleeves mounted in the ends of said cylinder and supporting said boxings, rolls mounted in said boxings, suitable gearing inclosed in one of said boxings for driving said rolls, a shaft connecting with said gearing and means for driving said shaft, substantially as and for the purpose set forth.

2. In a machine of the class described, the combination with a suitable cylinder, provided with flights or carriers upon its inner surface, with means for rotating said cylinder, suitable boxings arranged within said cylinder, rolls mounted in bearings in said boxings, and means inclosed in one of said boxings for driving said rolls, substantially as and for the purpose set forth.

3. In a machine of the class described, the combination with a suitable cylinder, provided with flights upon its inner surface, with suitable boxings arranged in said cylinder, rolls mounted in bearings in said boxings, means inclosed in one of said boxings for driving said rolls, and means for retaining said boxings in a horizontal position or permitting them to rotate with the cylinder, as desired, substantially as described.

4. The combination, in a machine of the class described of a suitable cylinder, provided with closed ends or heads, and with suitable hubs mounted in bearings, means for rotating said cylinder, suitable boxings arranged in said cylinder and supported upon sleeves extending through the cylinder hubs, rolls mounted in bearings in said boxes and means inclosed in one of said boxings for driving said rolls, substantially as described.

5. The combination, in a machine of the class described, with a suitable cylinder, provided with flights or carriers upon its inner surface, means for supporting and rotating said cylinder, suitable boxings arranged in said cylinder, rolls mounted in bearings in said boxings, means inclosed in one of said boxings for driving said rolls, and suitable non-metallic coverings surrounding and inclosing said boxings, substantially as and for the purpose set forth.

6. In a machine of the class described, the combination with the cylinder, provided with the tight ends or heads, of hubs secured upon said ends and mounted in suitable bearings in which they are free to rotate, means for driving said cylinder, suitable boxings arranged in said cylinder and provided with sleeves that extend centrally through the cylinder hubs, rolls mounted in said boxings, means inclosed in one of said boxings for driving said rolls, and means for securing said boxings in a stationary position while said cylinder is rotating or permitting said boxing to rotate with said cylinder as preferred, substantially as described.

7. The combination, with the rotating cylinder, provided with a series of flights, means for rotating said cylinder, the boxings arranged in said cylinder, hollow sleeves supporting said boxings and having drains for any material that collects therein, and the rolls mounted in bearings in said boxings, substantially as described.

8. The combination, with the rotating cylinder, provided with a series of flights, and with the tight ends or heads provided with suitable hubs, standards supporting said cylinder, boxings arranged within said cylinder and provided with sleeves or hollow shafts extending through the cylinder hubs, the rolls mounted in bearings in said boxings, the gearing arranged within one of said boxings, a driving shaft extending through one of said sleeves and connecting with said gearing, means for driving said cylinder, and means for connecting said shaft with said cylinder driving mechanism or disconnecting it therefrom, substantially as described and for the purpose set forth.

9. The combination, with the cylinder, provided with the closed ends and with hubs mounted in suitable bearings of the boxings arranged in said cylinder, the rolls mounted in bearings in said boxings, the shafts or sleeves secured upon said boxings and supported in said journal hubs and adapted to revolve therein, and the suitable stuffing boxes arranged in said hubs and surrounding said sleeves, substantially as and for the purpose set forth.

10. The combination, with the cylinder, the boxings arranged therein, the rolls mounted in said boxings, and a suitable vent tube connected with one of said boxings, for the purpose set forth.

11. The combination with the cylinder, mounted upon hollow axles or hubs, of suitable boxings arranged within said cylinder and supported upon sleeves or journals concentric with said cylinder supports, rolls mounted in bearings in said boxings, means for rotating said cylinder, and means for rotating said rolls.

12. The combination with the cylinder, provided with suitable hubs or journals, of boxings arranged within said cylinder and supported upon sleeves or journals concentric with and mounted in said cylinder hubs, rolls mounted in bearings in said boxings, means for rotating said cylinder, and means for holding said boxings stationary or permitting them to rotate with said cylinder, and means for driving said rolls.

13. The combination, with a suitable cylinder, mounted upon hollow hubs or journals, of boxings arranged within said cylinder, and mounted upon journals arranged in and concentric with said cylinder journals, stuffing boxes arranged between said journals and means for tightening said stuffing boxes, means for rotating said cylinder, and means for driving said rolls independently of said cylinder.

14. In a combined churn and butter worker, the combination with a cream-tight cylinder, of butter working rolls mounted upon boxings arranged within said cylinder, means for rotating said cylinder, and means for driving said rolls independently of said cylinder or permitting them to remain stationary as preferred.

15. In a combined churn and butter worker, the combination with a cream-tight cylinder and means for rotating the same, of suitable butter working rolls mounted in boxings arranged within said cylinder, means for driving said cylinder, means for holding said boxings in a stationary position, or permitting them to rotate with said cylinder, as preferred, and means for driving said rolls when said boxings are held in a stationary position, substantially as described and for the purpose set forth.

In testimony whereof I have hereunto set my hand this 18th day of April, A. D. 1894.

DARIUS W. PAYNE.

In presence of—
C. G. HAWLEY,
HATTIE A. CHAFFEE.